US012190903B2

(12) United States Patent
Hwang et al.

(10) Patent No.: US 12,190,903 B2
(45) Date of Patent: Jan. 7, 2025

(54) APPARATUS AND METHOD FOR GENERATING LIP SYNC IMAGE

(71) Applicant: DEEPBRAIN AI INC., Seoul (KR)

(72) Inventors: Guem Buel Hwang, Seoul (KR); Gyeong Su Chae, Seoul (KR)

(73) Assignee: DEEPBRAIN AI INC., Seoul (KR)

(*) Notice: Subject to any disclaimer, the term of this patent is extended or adjusted under 35 U.S.C. 154(b) by 248 days.

(21) Appl. No.: 17/764,324

(22) PCT Filed: Jun. 3, 2021

(86) PCT No.: PCT/KR2021/006913
§ 371 (c)(1),
(2) Date: Mar. 28, 2022

(87) PCT Pub. No.: WO2022/124498
PCT Pub. Date: Jun. 16, 2022

(65) Prior Publication Data

US 2023/0178095 A1 Jun. 8, 2023

(30) Foreign Application Priority Data

Dec. 10, 2020 (KR) ........................ 10-2020-0172024

(51) Int. Cl.
*G10L 21/10* (2013.01)
*G06T 13/40* (2011.01)
*G06T 13/80* (2011.01)

(52) U.S. Cl.
CPC .............. *G10L 21/10* (2013.01); *G06T 13/40* (2013.01); *G06T 13/80* (2013.01); *G10L 2021/105* (2013.01)

(58) Field of Classification Search
None
See application file for complete search history.

(56) References Cited

U.S. PATENT DOCUMENTS 10,803,646 B1 * 10/2020 Bogan, III ............. G06V 10/82
2021/0065712 A1 * 3/2021 Holm ...................... G10L 15/02
(Continued)

OTHER PUBLICATIONS

Ruobing Zheng et al., "Photorealistic Lip Sync with Adversarial Temporal Convolutional Networks", 2020, Retrieved from <URL: https://arxiv.org/pdf/2002.08700v1.pdf>.
(Continued)

*Primary Examiner* — James A Thompson
(74) *Attorney, Agent, or Firm* — The PL Law Group, PLLC

(57) ABSTRACT

An apparatus for generating a lip sync image according to a disclosed embodiment has one or more processors and a memory which stores one or more programs executed by the one or more processors. The apparatus includes a first artificial neural network model configured to generate an utterance synthesis image by using a person background image and an utterance audio signal corresponding to the person background image as an input, and generate a silence synthesis image by using only the person background image as an input, and a second artificial neural network model configured to output, from a preset utterance maintenance image and the first artificial neural network model, classification values for the preset utterance maintenance image and the silence synthesis image by using the silence synthesis image as an input.

9 Claims, 4 Drawing Sheets

102

111
M
FIRST ENCODER
117
PERSON BACKGROUND IMAGE
113
DECODER
115
SECOND ENCODER
UTTERANCE SYNTHESIS IMAGE
UTTERANCE AUDIO SIGNAL

(56) References Cited

U.S. PATENT DOCUMENTS

2021/0312685 A1* 10/2021 Guo ........................ G06T 17/20
2022/0036617 A1* 2/2022 Biswas ................... G06T 13/40

OTHER PUBLICATIONS

K R Prajwal et al., "A Lip Sync Expert Is All You Need for Speech to Lip Generation in the Wild", 2020, Retrieved from <URL: https://arxiv.org/pdf/2008.10010.pdf>.

Sanjana Sinha et al., "Identity-Preserving Realistic Talking Face Generation", 2020, Retrieved from <URL: https://arxiv.org/pdf/2005.12318.pdf>.

Tavi Halperin et al., "Dynamic Temporal Alignment of Speech to Lips", 2018, Retrieved from<URL: https://arxiv.org/pdf/1808.06250.pdf>.

Ran Yi et al., "Audio-driven Talking Face Video Generation with Learning-based Personalized Head Pose", 2020, Retrieved from <URL: https://arxiv.org/pdf/2002.10137.pdf>.

* cited by examiner 104
123
121
TRUE OR FALSE
102
UTTERANCE MAINTENANCE IMAGE
SILENCE SYNTHESIS IMAGE
117
DECODER
115
111
FIRST ENCODER
113
SECOND ENCODER
M
PERSON BACKGROUND IMAGE
SILENCE

APPARATUS AND METHOD FOR GENERATING LIP SYNC IMAGE

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/006913, filed Jun. 3, 2021, which claims priority to the benefit of Korean Patent Application No. 10-2020-0172024 filed on Dec. 10, 2020 the entirety the entire contents of which are incorporated herein by reference.

BACKGROUND

1. Technical Field

Embodiments of the present invention relate to a lip sync image generation technology.

2. Background Art

Nowadays, with the development of the artificial intelligence technology field, various types of content are generated based on an artificial intelligence technology. For example, when there is a voice message to be delivered, it may be desirable to generate an utterance video (lip sync video) in which the voice message sounds as if it is being delivered by a famous person (e.g., president or the like) so as to attract the attention of people. This is implemented by generating lip shapes or the like suitable for a specific message so that the lip shapes look as if a famous person is delivering the specific message in an image of the famous person.

Here, in order to generate a natural lip sync image, a learning model for generating a lip sync image should be trained so that a role according to each input may be distinguished. That is, in the learning model, a part using a voice signal as an input should be trained to control the movement associated with an utterance, such as the shape of a mouth or jaw, and a part using a person background image as an input should be trained to control other factors, such as facial movement, eye blinking, shape, position, and texture.

SUMMARY

Embodiments of the present invention is to provide an apparatus and method for generating a lip sync image capable of preventing a person background image from controlling a portion associated with an utterance.

According to a disclosed embodiment, an apparatus for generating a lip sync image having one or more processors and a memory which stores one or more programs executed by the one or more processors includes a first artificial neural network model configured to generate an utterance synthesis image by using a person background image and an utterance audio signal corresponding to the person background image as an input, and generate a silence synthesis image by using only the person background image as an input, and a second artificial neural network model configured to output, from a preset utterance maintenance image and the first artificial neural network model, classification values for the preset utterance maintenance image and the silence synthesis image by using the silence synthesis image as an input.

The person background image may be an image in which a portion associated with an utterance of a person is masked, and the utterance maintenance image may be an image in which the utterance movement of the person is constant.

The second artificial neural network model may be trained to classify the utterance maintenance image as True, and to classify the silence synthesis image as False.

The first artificial neural network model may includes a first encoder configured to use the person background image as an input, and extract an image feature vector from the input person background image, a second encoder configured to use the utterance audio signal corresponding to the person background image as an input, and extract a voice feature vector from the input utterance audio signal, a combiner configured to generate a combined vector by combining the image feature vector and the voice feature vector, and a decoder configured to use the combined vector as an input, and generate the utterance synthesis image based on the combined vector.

The decoder may be trained to restore the portion covered by the mask in the person background image based on the voice feature vector.

An objective function $L_{reconstruction}$ for the generation of the utterance synthesis image of the first artificial neural network model may be represented by the following equation.

$$L_{reconstruction}=\|y_t-G(x_t,a_t;\theta_g)\| \quad \text{(Equation)}$$

$y_t$: Original utterance image

G: Neural network constituting the first artificial neural network model $x_t$: Person background image for time t $a_t$: Utterance audio signal for time t $\theta_g$: Parameter of the neural network G $\|A-B\|$: Function for obtaining difference between A and B An objective function $L_{discriminator}$ of the second artificial neural network model may be represented by the following equation.

$$L_{discriminator}=-(\log(D(x_{idle};\theta_d))+\log(1=D(G(x_t,0);\theta_d))) \quad \text{(Equation)}$$

D: Neural network of the second artificial neural network model $x_{idle}$: Utterance maintenance image $\theta_d$: Parameter of the neural network D)

$G(x_t, 0)$: Silence synthesis image output by the first artificial neural network model An adversarial objective function $L_{adversarial}$ for the generation of the silence synthesis image of the first artificial neural network model may be represented by the following equation.

$$L_{adversarial}=-(\log(D(G(x_t,0;\theta_g))) \quad \text{(Equation)}$$

A final objective function $L_T$ for the generation of the utterance synthesis image and the silence synthesis image of the first artificial neural network model may be represented by the following equation.

$$L_T=L_{reconstruction}+\lambda L_{adversarial} \quad \text{(Equation)}$$

λ: Weight

According to a disclosed embodiment, a method for generating a lip sync image performed by a computing device having one or more processors and a memory which stores one or more programs executed by the one or more processors includes generating, in a first artificial neural network model, an utterance synthesis image by using a person background image and an utterance audio signal corresponding to the person background image as an input, generating, in the first artificial neural network model, a silence synthesis image by using only the person background image as an input, and outputting, in a second artificial neural network model, from a preset utterance maintenance image and the first artificial neural network model, classification values for the preset utterance maintenance image and the silence synthesis image by using the silence synthesis image as an input.

According to a disclosed embodiment, a first artificial neural network model generates an utterance synthesis image by using a person background image and an utterance audio signal as an input and generates a silence synthesis image by using only the person background image as an input, and a second artificial neural network model is trained to classify the utterance maintenance image as True and to classify the silence synthesis image as False, so that it is possible to perform training to allow the utterance movement of a person in the silence synthesis image to be constant (i.e., a portion associated with an utterance is not moving), thereby preventing the person background image from controlling the portion associated with the utterance, and inducing the portion associated with the utterance to be controlled only by the utterance audio signal.

DETAILED DESCRIPTION

Hereinafter, specific embodiments of the present invention will be described with reference to the accompanying drawings. The following detailed description is provided to assist in a comprehensive understanding of the methods, devices and/or systems described herein. However, the detailed description is only illustrative, and the present invention is not limited thereto.

In describing embodiments of the present invention, when a specific description of known technology associated with the present invention is deemed to make the gist of the present invention unnecessarily vague, the detailed description thereof will be omitted. The terms used below are defined in consideration of functions in the present invention, but may vary in accordance with the customary practice or the intention of a user or an operator. Therefore, the terms should be defined based on whole content throughout the present specification. The terms used herein are only for describing the embodiments of the present invention, and should not be construed as limited. A singular expression includes a plural meaning unless clearly used otherwise. In the present description, expressions such as "include" or "have" are for referring to certain characteristics, numbers, steps, operations, components, and some or combinations thereof, and should not be construed as excluding the presence or possibility of one or more other characteristics, numbers, steps, operations, components, and some or combinations thereof besides those described.

In the following description, the terms "transmission," "communication," and "reception" of a signal or information and other similar terms may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same applies to "reception" of the signal or information. In addition, in the present specification, a meaning in which two or more pieces of data or information are "related" indicates that when any one piece of data (or information) is obtained, at least a portion of other data (or information) may be obtained based thereon.

Furthermore, the terms "first," "second," and the like may be used for describing various elements, but the elements should not be construed as being limited by the terms. These terms may be used for distinguishing one element from another element. For example, a first element could be termed a second element and vice versa without departing from the scope of the present invention.

Figure 1:
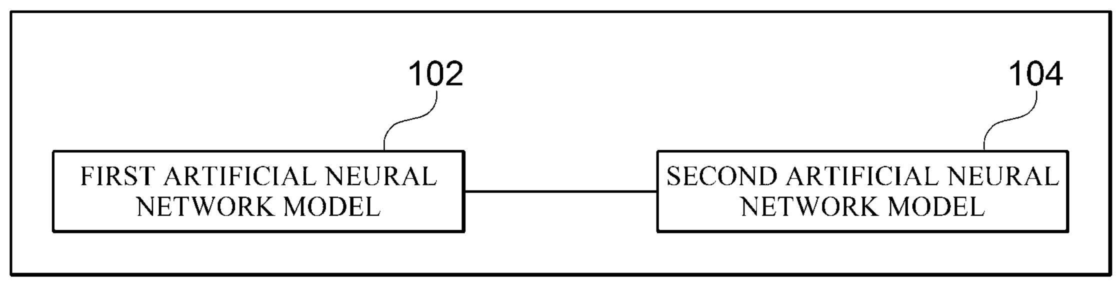
FIG. 1 is a diagram showing the configuration of an apparatus for generating a lip sync image according to an embodiment of the present invention.

FIG. 1 is a diagram showing the configuration of an apparatus for generating a lip sync image according to an embodiment of the present invention.

Referring to FIG. 1, an apparatus for generating a lip sync image 100 may include a first artificial neural network model 102 and a second artificial neural network model 104.

The first artificial neural network model 102 may be a model to be trained to generate an utterance synthesis image by using a person background image and an utterance audio signal as an input. Here, the person background image is an image in which a person utters (speaks), and may be an image in which a portion associated with the utterance of the person in the image is masked. Here, the utterance audio signal may be an audio portion in the person background image (i.e., an image in which a person utters).

Here, the first artificial neural network model 102 may be trained to generate the utterance synthesis image by restoring the masked portion associated with the utterance in the person background image through the input utterance audio signal. At this time, it is necessary to prevent the person background image from controlling the portion associated with an utterance. That is, it is necessary to allow the portion associated with an utterance to be controlled only through the utterance audio signal, and to prevent the portion from being controlled by the person background image.

Therefore, in a disclosed embodiment, it is possible to generate a silence synthesis image by allowing the first artificial neural network model 102 to use only the person background image as an input. Here, the silence synthesis image may mean that a lip sync image is synthesized only with the person background image without an audio signal.

The silence synthesis image is a lip sync image generated only with the person background image without an audio signal (i.e., zero audio), and thus, should be a lip sync image in which a portion of the person background image not covered by a mask should be followed while the utterance movement of a person is fixed. However, in a training process of the first artificial neural network model 102, when training is performed to allow the person background image to control a portion associated with an utterance, a silence synthesis image in which the portion associated with the utterance of a person is moving may be generated even without an audio signal.

Therefore, in the disclosed embodiment, in order to prevent the person background image from controlling the portion associated with the utterance, training may be performed to classify the silence synthesis image generated by the first artificial neural network model 102 as False though the second artificial neural network model 104.

That is, the second artificial neural network model 104 may be trained to classify as True when a preset utterance maintenance image is input, and to classify as False when a silence synthesis image generated by the first artificial neural network model 102 is input. Here, the utterance maintenance image may mean an image in which the utterance movement of a corresponding person is constant. For example, the utterance maintenance image may be an image in which the mouth of the corresponding person is closed.

As such, since training is performed such that the utterance maintenance image of the corresponding person is classified as True and the silence synthesis image is classed as False through the second artificial neural network model 104, it is possible to perform training to allow the utterance movement of a person in the silence synthesis image to be constant (i.e., a portion associated with an utterance is not moving), thereby preventing the person background image from controlling the portion associated with the utterance, and inducing the portion associated with the utterance to be controlled only by the utterance audio signal.

Figure 2:
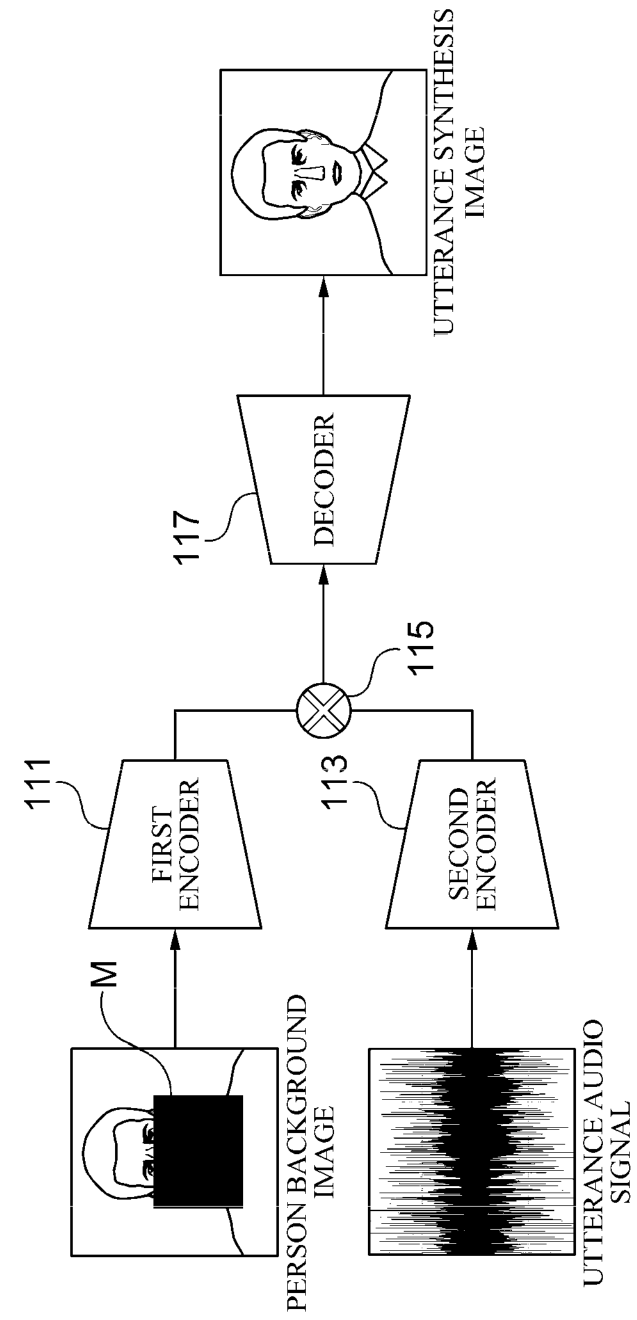
FIG. 2 is a diagram schematically showing a state in which a first artificial neural network model generates an utterance synthesis image according to an embodiment of the present invention.

FIG. 2 is a diagram schematically showing a state in which the first artificial neural network model 102 generates an utterance synthesis image according to an embodiment of the present invention.

Referring to FIG. 2, the first artificial neural network model 102 may include a first encoder 111, a second encoder 113, a combiner 115, and a decoder 117.

In an example embodiment, the first artificial neural network model 102 may be implemented by a convolutional neural network (CNN)-based machine learning technology, but the machine learning technology is not limited thereto, and other various machine learning technologies may be applied.

The first encoder 111 may be trained to extract an image feature vector by using a person background image as an input. Hereinafter, the term “vector” may also be used to refer to include “tensor”.

Here, the person background image input to the first encoder 111 is an image in which a person utters (speaks). The person background image may be an image including a face and upper body of a person. That is, the person background image may be an image including not only the face but also the upper body of a person who utters so as to show movements of the face, neck, shoulder, and the like of the corresponding person, but is not limited thereto, and may be an image including the face of the person.

A portion associated with an utterance in the person background image input to the first encoder 111 may be masked. That is, the portion (e.g., a mouth and portions around the mouth) associated with the utterance in the person background image may be covered by a mask M. In addition, during a masking process, portions associated with facial movement, neck movement, shoulder movement, and the like as a result of the utterance of the person in the person background image may not be masked. Then, the first encoder 111 extracts an image feature vector of a portion excluding the portion associated with the utterance in the person background image.

The first encoder 111 may include at least one convolutional layer and at least one pooling layer. The convolutional layer, while moving a filter of a preset size (e.g., 3×3 pixel size) at regular intervals in the input person background image, may extract a feature value of pixels corresponding to the filter. The pooling layer may receive an output from the convolutional layer as an input to perform down sampling.

The second encoder 113 may use the utterance audio signal as an input. The second encoder 113 may be trained to extract a voice feature vector by using the utterance audio signal as an input.

Here, the utterance audio signal corresponds to an audio portion in the person background image (i.e., an image in which a person utters) input to the first encoder 111. In other words, a video portion in a video in which a person utters may be input to the first encoder 111, and an audio portion may be input to the second encoder 113. The second encoder 113 may include at least one convolutional layer and at least one pooling layer, but a neural network structure of the second encoder 113 is not limited thereto.

The person background image input to the first encoder 111 and the utterance audio signal input to the second encoder 113 may be synchronized in time. That is, in a section of the same time band in a video in which a person utters, video may be input to the first encoder 111, and audio may be input to the second encoder 113. For example, when the person background image is an image for time t from a specific point of time, the utterance audio signal may be a voice for the time t from the same point of time. At this time, the person background image and the utterance audio signal may be input to the first encoder 111 and the second encoder 113 every preset unit time (e.g., one frame or a plurality of successive frames).

The combiner 115 may generate a combined vector by combining the image feature vector output from the first encoder 111 and the voice feature vector output from the second encoder 113. In an example embodiment, the combiner 115 may concatenate the image feature vector and the voice feature vector to generate a combined vector, but is not limited thereto.

The decoder 117 may generate an utterance synthesis image by using the combined vector output from the combiner 115 as an input. Specifically, the decoder 117 may be trained to restore the portion (i.e., the portion associated with the utterance) covered by the mask M of the image feature vector (i.e., a video portion in a video in which a person utters, a feature of a portion in which a portion associated with an utterance is covered by a mask) output from the first encoder 111, on the basis of the voice feature vector (i.e., a feature of an audio portion in the video in which a person utters) output from the second encoder 113.

That is, when a portion associated with an utterance is masked in the person background image, the decoder 117 may be a model trained to restore the masked region using the utterance audio signal. The decoder 117 may compare a generated utterance synthesis image with an original utterance image (i.e., a correct value), and may adjust a training parameter (e.g., a loss function, a softmax function, etc.) such that the generated utterance synthesis image approximates the original utterance image (i.e., to minimize the difference with the original utterance image).

Meanwhile, an objective function $L_{reconstruction}$ for the generation of the utterance synthesis image by the first artificial neural network model 102 using the person background image and the utterance audio signal as an input may be represented by Equation 1 below.

$$L_{reconstruction}=\|y_t-G(x_t,a_t;\theta_g)\| \quad \text{(Equation 1)}$$

$y_t$: Original utterance image

G: Neural network constituting the first artificial neural network model $x_t$: Person background image for time t $a_t$: Utterance audio signal for time t $\theta_g$: Parameter of the neural network G $\|A-B\|$: Function obtaining difference between A and B, which may include, for example, a function obtaining the Euclidean distance (L2 distance) or the Manhattan distance (L1 distance) of A and B.

Figure 3:
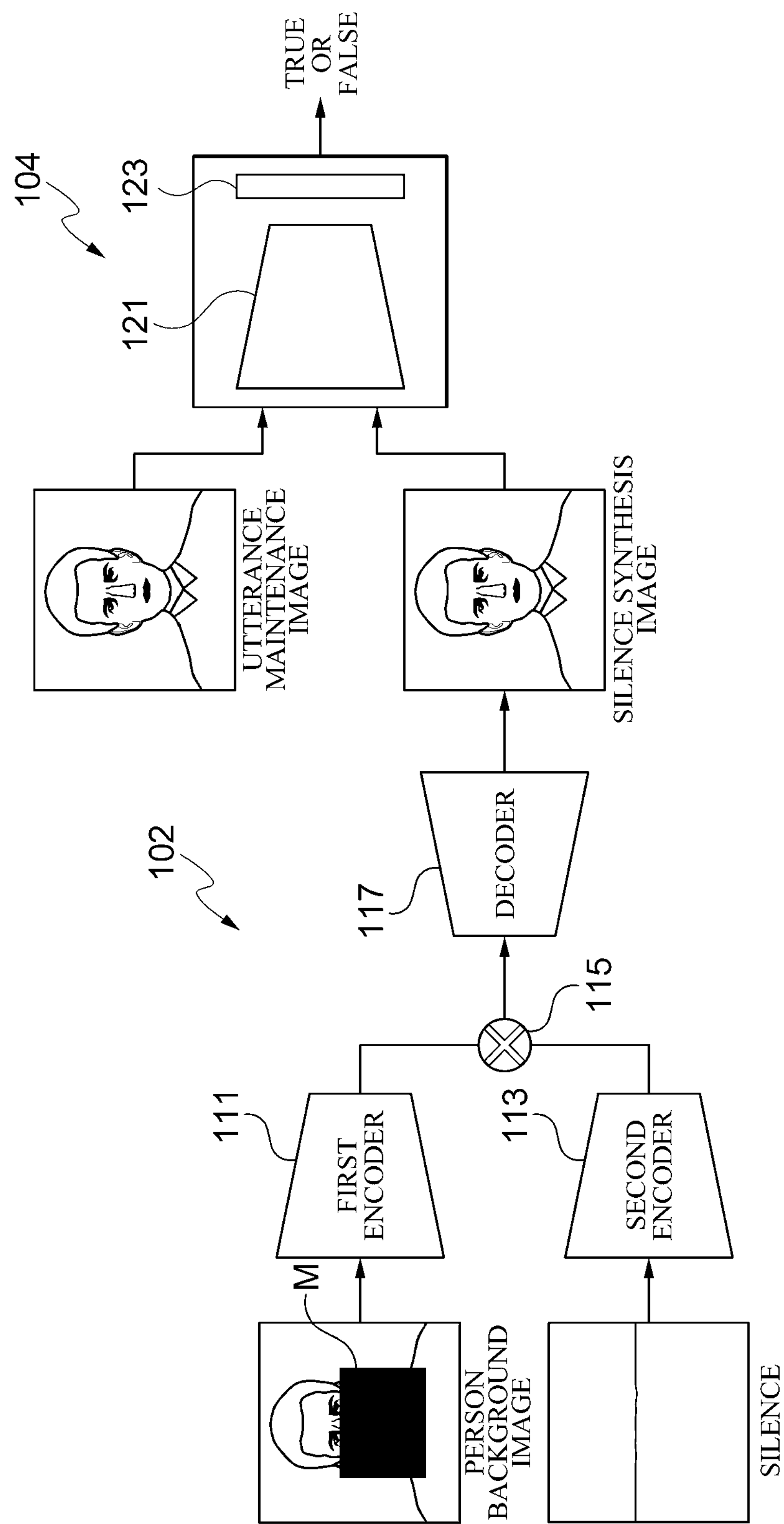
FIG. 3 is a diagram showing the configuration for classifying and learning a silence synthesis image as False according to an embodiment of the present invention.

FIG. 3 is a diagram showing the configuration for classifying and learning a silence synthesis image as False according to an embodiment of the present invention.

Referring to FIG. 3, the first artificial neural network model 102 may generate the silence synthesis image by using only the person background image. Specifically, the first encoder 111 may extract the image feature vector by using the person background image as an input. At this time, a separate audio signal may not input to the second encoder 113 or a signal having 0 audio value may be input to the second encoder 113.

The combiner 115 combines the image feature vector output from the first encoder 11 with the voice feature vector output from the second encoder 113 to generate a combined vector, and since the voice feature vector output from the second encoder 113 is zero, the combined vector becomes identical with the image feature vector. That is, the combiner 115 may input the image feature vector, which is output from the first encoder 111, as it is to the decoder 117. The decoder 117 may generate the silence synthesis image by using the image feature vector as an input. The silence synthesis image may be input to the second artificial neural network model 104.

The second artificial neural network model 104 receives a pre-stored utterance maintenance image and the silence synthesis image, and may output a classification value by classifying the pre-stored utterance maintenance image and the silence synthesis image as True or False. Here, the utterance maintenance image may be an image in which the utterance movement of a person in the person background image is constant (e.g., an image in which the mouth of the corresponding person is closed, and the like). In an example embodiment, the utterance maintenance image may be acquired by detecting frames with constant utterance movement in an image of the corresponding person.

The second artificial neural network model 104 may be trained to classify the utterance maintenance image as True, and to classify the silence synthesis image as False. In an example embodiment, the second artificial neural network model 104 may include a third encoder 121 and a classifier 123. The third encoder 121 may extract an image feature vector from an input image (the utterance maintenance image or the silence synthesis image). The classifier 123 may classify the input image as True or False on the basis of the image feature vector output from the third encoder 121.

Here, since the silence synthesis image is classified as False by the second artificial neural network model 104, the first neural network model 102 may be trained to allow the utterance movement of a person in the silence synthesis image generated only by the person background image without an audio signal to be constant, thereby preventing the person background image from controlling the portion associated with the utterance, and inducing the portion associated with the utterance to be controlled only by the utterance audio signal.

Here, the first artificial neural network model 102 and the second artificial neural network model 103 may form a generative adversarial network. The first artificial neural network model 102 may correspond to a generator in the generative adversarial network, and the second artificial neural network model 104 may correspond to a discriminator in the generative adversarial network. That is, the first artificial neural network model 102 is a separate neural network model which generates the utterance synthesis image, and also, may constitute a part (i.e., a generator) of the generative adversarial network which generates the silence synthesis image.

At this time, an objective function $L_{discriminator}$ of the second artificial neural network model 104 may be represented by Equation 2 below.

$$L_{discriminator}=-(\log(D(x_{idle};\theta_d))+\log(1-D(G(x_t,0);\theta_d))) \quad \text{(Equation 2)}$$

D: Neural network of the second artificial neural network model $x_{idle}$: Utterance maintenance image $\theta_d$: Parameter of the neural network D $G(x_t, 0)$: Silence synthesis image output by first artificial neural network model In addition, an optimized parameter $\theta^*_d$ of the second artificial neural network model 104 may be represented by Equation 3 below.

$$\theta^*_d=\text{argmin}_{\theta d}(L_{discriminator}) \quad \text{(Equation 3)}$$

Here, $\text{argmin}_{\theta d}$ represents a function that obtains $\theta_d$ for minimizing the $L_{discriminator}$.

In addition, an adversarial objective function $L_{adversarial}$ of the first artificial neural network model 102 for generating the silence synthesis image may be represented by Equation 4 below.

$$L_{adversarial}=-(\log(D(G(x_t,0;\theta_g))) \quad \text{(Equation 4)}$$

The adversarial objective function $L_{adversarial}$ may be an objective function which induces the first artificial neural network model 102 to determine the silence synthesis image as True in the second artificial neural network model 104. That is, the adversarial objective function $L_{adversarial}$ may be an objective function which induces the first artificial neural network model 102 to minimize the difference between the silence synthesis image and the utterance maintenance image.

In addition, a final objective function $L_T$ of the first artificial neural network model 102 for generating the utterance synthesis image and the silence synthesis image may be represented by Equation 5 below.

$$L_T=L_{reconstruction}+\lambda L_{adversarial} \quad \text{(Equation 5)}$$

$\lambda$: Weight

In addition, an optimized parameter $\theta^*_g$ of the first artificial neural network model 102 may be represented by Equation 6 below.

$$\theta^*_g=\text{argmin}_{\theta d}(L_T) \quad \text{(Equation 6)}$$

Here, $\text{argmin}_{\theta g}$ represents a function that obtains $\theta_g$ for minimizing the $L_T$.

Figure 4:
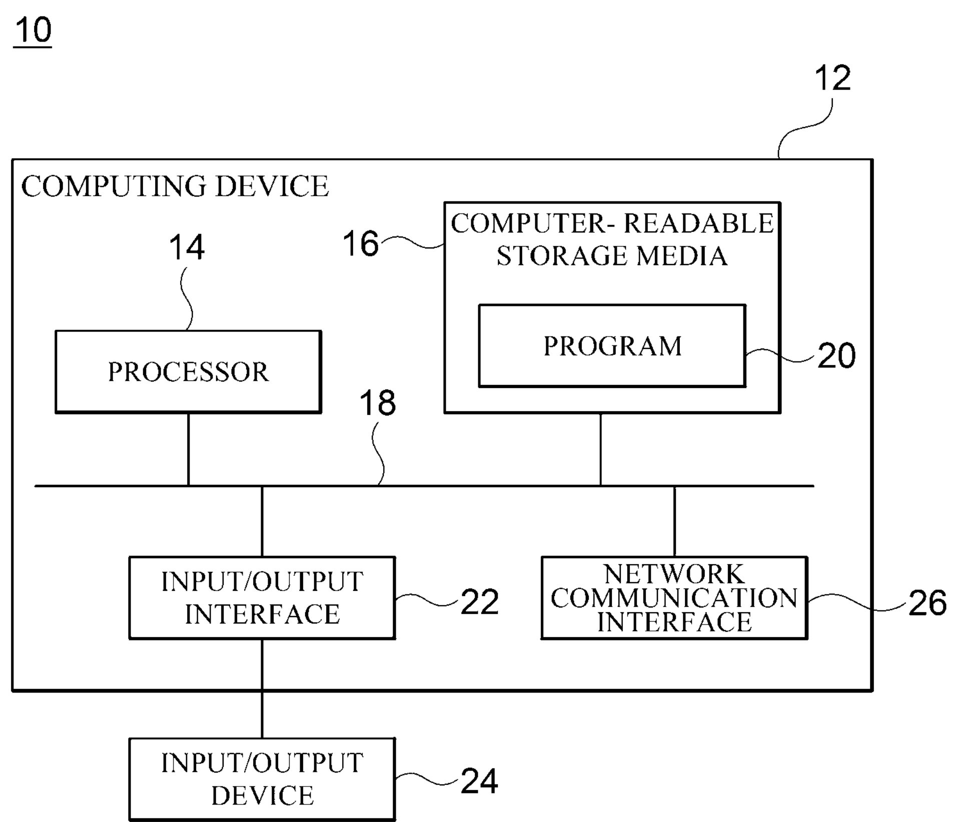
FIG. 4 is a block diagram for describing an example of a computing environment including a computing device suitable for being used in example embodiments.

FIG. 4 is a block diagram for describing an example of a computing environment 10 including a computing device suitable for being used in example embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the apparatus for generating a lip sync image 100.

The computing device 12 includes at least one processor 14, a computer-readable storage medium 16, and a communication bus 18. The processor 14 may allow the computing device 12 to operate according to the example embodiment mentioned above. For example, the processor 14 may execute one or more programs stored in the computer-readable storage medium 16. The one or more programs may include one or more computer-executable commands, and when executed by the processor 14, the computer-executable command may be configured to allow the computing device 12 to perform operations according to the example embodiment.

The computer-readable storage medium 16 is configured to store computer-executable commands or program codes, program data, and/or other suitable types of information. A program 20 stored in the computer-readable storage medium 16 includes a set of commands executable by the processor 14. In one embodiment, the computer-readable storage medium 16 may be a memory (a volatile memory such as a random access memory, a non-volatile memory, or any suitable combination thereof), one or more magnetic disk storage devices, optical disk storage devices, flash memory devices, other types of storage media accessible by the computing device 12 and capable of storing desired information, or any suitable combination thereof.

The communication bus 18 includes the processor 14 and the computer-readable storage medium 16 to interconnect various other components of the computing device 12.

The computing device 12 may also include one or more input/output interfaces 22 which provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or track pad), a keyboard, a touch input device (such as a touch pad or touch screen), a voice or sound input device, an input device such as various types of sensor devices and/or photographing devices, and/or an output device such as a display device, a printer, a speaker, and/or a network card. The exemplary input/output device 24 may be included inside the computing device 12 as one component constituting the computing device 12, or may be connected to the computing device 12 as a separate device distinct from the computing device 12.

Although the example embodiment of the present invention has been described in detail as above, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An apparatus for generating a lip sync image having one or more processors and a memory which stores one or more programs executed by the one or more processors, the apparatus comprising:

a first artificial neural network model configured to generate an utterance synthesis image by using a person background image and an utterance audio signal corresponding to the person background image as an input, and generate a silence synthesis image by using only the person background image as an input; and a second artificial neural network model configured to output classification values for a preset utterance maintenance image and the silence synthesis image by using the preset utterance maintenance image and the silence synthesis image as an input, wherein the utterance maintenance image is an image in which the utterance movement of the person is constant, and the silence synthesis image is a lip sync image generated only with the person background image without an audio signal, wherein the second artificial neural network model is trained to classify the utterance maintenance image as True, and to classify the silence synthesis image as False.

2. The apparatus of claim 1, wherein the person background image is an image in which a portion associated with an utterance of a person is masked.

3. The apparatus of claim 2, wherein the first artificial neural network model comprises:

a first encoder configured to use the person background image as an input, and extract an image feature vector from the input person background image;

a second encoder configured to use the utterance audio signal corresponding to the person background image as an input, and extract a voice feature vector from the input utterance audio signal;

a combiner configured to generate a combined vector by combining the image feature vector and the voice feature vector; and a decoder configured to use the combined vector as an input, and generate the utterance synthesis image based on the combined vector.

4. The apparatus of claim 3, wherein the decoder is trained to restore the portion covered by the mask in the person background image based on the voice feature vector.

5. The apparatus of claim 2, wherein an objective function $L_{reconstruction}$ for the generation of the utterance synthesis image of the first artificial neural network model is represented by the following equation:

$$L_{reconstruction}=\|y_t-G(x_t,a_t;\theta_g)\|$$

where $y_t$ is Original utterance image;

G is Neural network constituting the first artificial neural network model;

$x_t$ is Person background image for time t;

$a_t$ is Utterance audio signal for time t;

$\theta_g$ is Parameter of the neural network G; and $\|A-B\|$ is Function for obtaining difference between A and B.

6. The apparatus of claim 5, wherein an objective function $L_{discriminator}$ of the second artificial neural network model is represented by the following equation:

$$L_{discriminator}=-(\log(D(x_{idle};\theta_d))+\log(1-D(G(x_t,0);\theta_d)))$$

where D is Neural network of the second artificial neural network model;

$x_{idle}$ is Utterance maintenance image;

$\theta_d$ is Parameter of the neural network D; and

G $(x_t,0)$ is Silence synthesis image output by the first artificial neural network model.

7. The apparatus of claim 6, wherein an adversarial objective function $L_{adversarial}$ for the generation of the silence synthesis image of the first artificial neural network model is represented by the following equation:

$$L_{adversarial}=-(\log(D(G(x_t,0;\theta_g)))).$$

8. The apparatus of claim 7, wherein a final objective function $L_T$ for the generation of the utterance synthesis image and the silence synthesis image of the first artificial neural network model is represented by the following equation:

$$L_T=L_{reconstruction}+\lambda L_{adversarial}$$

where λ is Weight.

9. A method for generating a lip sync image performed by a computing device having one or more processors and a memory which stores one or more programs executed by the one or more processors, the method comprising:

generating, in a first artificial neural network model, an utterance synthesis image by using a person background image and an utterance audio signal corresponding to the person background image as an input;

generating, in the first artificial neural network model, a silence synthesis image by using only the person background image as an input; and outputting, in a second artificial neural network model, classification values for a preset utterance maintenance image and the silence synthesis image by using the preset utterance maintenance image and the silence synthesis image as an input, wherein the utterance maintenance image is an image in which the utterance movement of the person is constant, and the silence synthesis image is a lip sync image generated only with the person background image without an audio signal, wherein the second artificial neural network model is trained to classify the utterance maintenance image as True, and to classify the silence synthesis image as False.

* * * * *